United States Patent [19]

Thackery

[11] 4,026,337

[45] May 31, 1977

[54] POWER TOOL

[76] Inventor: Russell H. Thackery, 2376 Brentwood Road, Columbus, Ohio 43209

[22] Filed: Apr. 19, 1976

[21] Appl. No.: 678,247

[52] U.S. Cl. ............................ 144/193 R; 74/13; 180/53 WA; 144/3 K; 403/3

[51] Int. Cl.² .................... B27L 7/00; B60K 17/28

[58] Field of Search ............ 180/53 R, 53 A, 53 B, 180/53 D, 53 WA; 74/13, 15, 15.6, 15.69; 144/193 R, 193 A–193 D, 3 K, 2 R, 309 R, 320; 403/3

[56] References Cited

UNITED STATES PATENTS

| | | | |
|---|---|---|---|
| 1,407,533 | 2/1922 | Hensley | 74/15 X |
| 3,670,789 | 6/1972 | Long | 144/193 D |

*Primary Examiner*—Othell M. Simpson
*Assistant Examiner*—W. D. Bray
*Attorney, Agent, or Firm*—Palmer Fultz

[57] ABSTRACT

A power tool driven by a vehicle wheel hub characterized by a removable mounting means which comprises a plurality of lug extenders adapted for removal attachment to the existing lugs which normally retain the wheel on the vehicle. The lug extenders are arranged to utilize various existing lug bolt nuts such that they are universally adaptable to various models of vehicle sizes and configurations.

4 Claims, 2 Drawing Figures

FIG. 1.

POWER TOOL

BACKGROUND OF THE INVENTION

This invention relates generally to a power tool adapted to be mounted on and driven by the hub of a driven vehicle wheel and more particularly to a lug extender construction which is universally adaptable to a plurality of hub configurations.

SUMMARY OF THE INVENTION

In general, the present invention comprises a power tool such as a log splitting device which includes a shank portion with an outer piercing end and an inner base portion and an inner base plate provided with a plurality of mounting holes.

The apparatus further includes a plurality of lug extenders each of which includes an inner end adapted to be connected to a lug on a vehicle hub and an outer end provided with a detachable threaded bolt and nut arrangement for removably securing the mounting plate of the tool to the outer end of the lug extender.

It is therefore an object of the present invention to provide a novel power tool and associated mounting arrangement for securing the tool to the driven hub of a vehicle wheel.

It is another object of the present invention to provide a novel power tool of the type described that comprises a novel lug extender construction which utilizes the existing lug nuts for mounting the extenders on the hub.

It is still another object of the present invention to provide an apparatus of the type described wherein a single size of lug extender can be readily adapted to fit a plurality of different vehicle hub sizes and lug arrangements.

Further objects and advantages of the present invention will be apparent from the following description, reference being had to the accompanying drawings wherein a preferred form of embodiment of the invention is clearly shown.

DESCRIPTION OF THE PREFERRED EMBODIMENT

Figure 1:
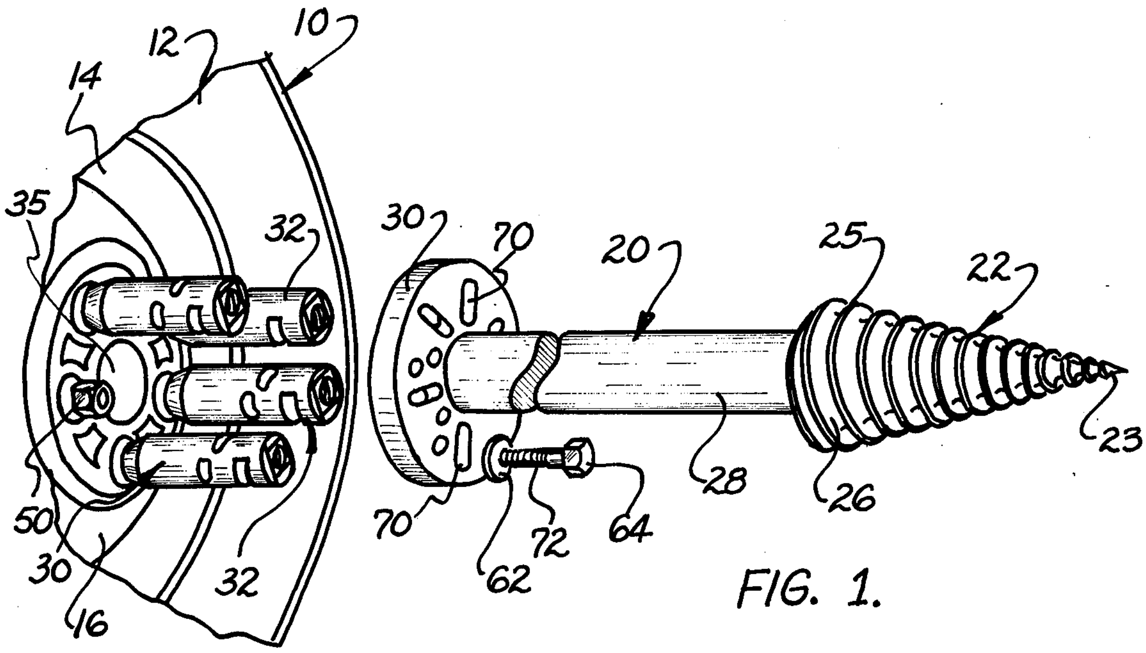
FIG. 1 is a partial perspective view of a power tool and vehicle wheel constructed in accordance with the present invention.

Referring in detail to the drawings, FIG. 1 illustrates a power tool indicated generally at 20 which includes a shank portion 28, a conical tip portion 22, which includes a piercing point 23 and convolutions 26, and a mounting plate 30, the latter including a plurality of plate mounting holes 70.

It should be mentioned that the log splitter 20 necessitates the use of an axle jack and supporting means for raising and maintaining vehicle wheel 10 above the ground level with such log splitter and jacking and supporting means being illustrated and described in detail in my co-pending applications U.S. Ser. No. 578,539 filed May 19, 1975 and U.S. Ser. No. 678,352 filed Apr. 19, 1976.

With continued reference to FIG. 1, mounting plate 30 of the tool is secured to a hub 35 of driven wheel 10 which is of the conventional type and includes a tire 12, wheel plate 16, and rim 14, with the wheel plate including inwardly beveled surfaces surrounding holes 31 through which the wheel mounting lugs 33 are extended.

Figure 2:
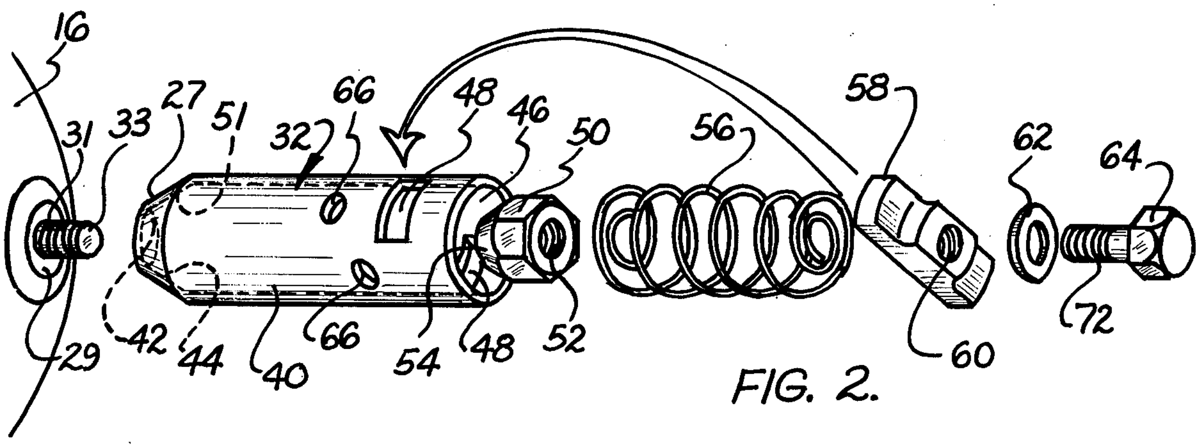
FIG. 2 is an exploded perspective view of a lug extender constructed in accordance with the present invention.

With continued reference to FIGS. 1 and 2, the wheel is normally bolted to hub 35 by a plurality of lug nuts 50.

When it is desired to attach tool 20 to the hub, then a plurality of lug extenders, each of which is indicated generally at 32, are attached at their inner ends to the existing lug bolts 33 by means of the previously mentioned lug nuts 50.

With reference to FIG. 2, a lug nut 50 is extended into the bore 46 in the body portion 40 with the tapered nose 54 of the nut being bottomed on a tapered shoulder 44. The inner surface of body portion 40 adjacent the tapered shoulder is provided with flats which conform with the flats on lug nut 50 so as to prevent relative rotation between the lug nuts and the body portion.

A compression spring 56, FIG. 2, is next inserted into bore 46 above lug nut 50 and a transverse bar 58 is extended through the square apertures 48 formed in the side wall of the body portion. Transverse bar 58 includes wings 59 which extend outwardly in apertures 48 and the central portion includes a threaded hole 60 for receiving the plate mounting bolt 64.

It should be mentioned that the body 40 of the lug extender 32 is provided with a plurality of holes 66, FIG. 2, for the insertion of a bar wrench which provides a handle for rotating body portion 40 of the lug extender to tighten it down against wheel plate 16.

In operation, the lug extenders 32 are assembled and screwed onto the vehicle wheel studs 33 with the tapered noses 27 seated into the beveled surfaces 29 in the wheel plate. All the extenders are tightened by hand and then loosened one quarter turn.

It should be mentioned that the mounting plate 30 is preferably provided with a plurality of mounting hole patterns so as to adapt a single plate construction to a plurality of different lug arrangements.

The proper hole pattern is next selected and the tool is held in position with the mounting holes registering with the holes 60 in the transverse bars 58.

The bolts 64, with washers 62 assembled thereon, are next inserted through mounting holes 70 and screwed into the respective holes 60 in the transverse bars 58.

A bar wrench is next inserted into holes 66 in the body portion 40 and actuated to tighten the lug extenders under the hub. The plate mounting bolts 64 are next tightened to firmly secure tool 20 in position on the lug extenders.

While the form of embodiment of the present invention as herein disclosed constitutes a preferred form, it is to be understood that other forms might be adopted.

What is claimed is:

1. A power tool driven by a vehicle wheel hub comprising, in combination, a driven wheel hub; a plurality of fixed threaded elements on said hub; a plurality of removable threaded elements for normally attaching a wheel to the hub, each of said removable threaded elements being in threaded engagement with a respective one of the fixed threaded elements; a plurality of adapter means each of which is mounted to said hub by a respective pair of the threaded elements, each of said adapter means comprising a hollow body portion including a hub engaging end provided with a bore and an internal shoulder surrounding said bore, one of said threaded elements being extended through said bore whereby tightening of the elements clamps said shoulder and tightens the adapter on the hub, each of said adapters comprising a tool mounting end; a tool including a mounting base portion; and a plurality of tool mounting threaded elements removably securing said mounting base portion to the tool mounting ends of the adapter means.

2. A power tool driven by a vehicle wheel hub comprising, in combination, a driven wheel hub; a plurality of fixed threaded elements on said hub; a plurality of removable threaded elements for normally attaching a wheel to the hub, each of said removable threaded elements being in threaded engagement with a respective one of the fixed threaded elements; a plurality of adapter means each of which is mounted to said hub by a respective pair of the threaded elements, each of said adapter means comprising a hollow body portion including a hub engaging end provided with a bore and an internal shoulder surrounding said bore, one of said threaded elements being extended through said bore whereby tightening of the elements clamps said shoulder and tightens the adapter on the hub, each of said adapters comprising a tool mounting end including side walls provided with slots and a longitudinal bore; a transverse bar removably disposed in said slots and including a central tool mounting threaded portion; a tool including a mounting base portion positioned on said tool mounting ends and including base holes that register with said longitudinal bores; and a plurality of tool mounting threaded elements including threaded portions fastened to said threaded portions of respective transverse bars.

3. The apparatus defined in claim 1 that includes a spring means in said adapter for urging said removable threaded elements towards said fixed threaded elements.

4. The apparatus defined in claim 2 that includes a spring means in said adapter for urging said removable threaded elements towards said fixed threaded elements.

* * * * *